United States Patent
Boete

(10) Patent No.: US 11,919,400 B2
(45) Date of Patent: Mar. 5, 2024

(54) POWERTRAIN FOR A MILD HYBRID VEHICLE AND VEHICLE COMPRISING THE SAME

(71) Applicant: VOLVO TRUCK CORPORATION, Gothenburg (SE)

(72) Inventor: Yann Boete, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/756,421

(22) PCT Filed: Nov. 26, 2019

(86) PCT No.: PCT/EP2019/082620
§ 371 (c)(1),
(2) Date: May 25, 2022

(87) PCT Pub. No.: WO2021/104612
PCT Pub. Date: Jun. 3, 2021

(65) Prior Publication Data
US 2022/0410690 A1    Dec. 29, 2022

(51) Int. Cl.
*B60K 6/365*    (2007.10)
*B60K 6/383*    (2007.10)
(Continued)

(52) U.S. Cl.
CPC .............. *B60K 6/365* (2013.01); *B60K 6/383* (2013.01); *B60K 6/485* (2013.01); *B60K 2006/4816* (2013.01); *B60K 2006/4833* (2013.01)

(58) Field of Classification Search
CPC ........ B60K 6/365; B60K 6/383; B60K 6/485; B60K 6/387; B60K 6/48; B60K 6/36;
(Continued)

(56) References Cited

U.S. PATENT DOCUMENTS

2002/0123407 A1* 9/2002 Hanyu .................... B60K 6/48
                                                          903/905
2012/0115668 A1    5/2012 Justin
(Continued)

FOREIGN PATENT DOCUMENTS

WO    2011010182 A1    1/2011
WO    2018109515 A1    6/2018
WO    WO-2018109515 A1 * 6/2018 ............. B60K 25/02

OTHER PUBLICATIONS

International Search Report and Written Opinion in corresponding International Application No. PCT/EP2019/082620 dated Aug. 10, 2020 (14 pages).

*Primary Examiner* — Tisha D Lewis
(74) *Attorney, Agent, or Firm* — Venable LLP; Jeffri A. Kaminski

(57) ABSTRACT

A powertrain includes an engine; a driveline including a gearbox having an input shaft connected to the engine, an output shaft to be connected to driving wheels of the vehicle and a countershaft for transmitting a rotation of the input shaft to the output shaft which can be coupled to the input shaft; an electric machine; a gear reduction mechanism having a free wheel and at least three separate and rotatable junction elements, the rotational speeds of the junction elements being interdependent but not having a fixed ratio relative to one another: a first junction element that is connected to the electric machine; a second junction element that is connectable to the free wheel; a third junction element that is connected to the countershaft. The torque ratio between the third junction element and the first junction element can be selected from at least two different ratios.

15 Claims, 6 Drawing Sheets

(51) Int. Cl.
*B60K 6/485* (2007.10)
*B60K 6/48* (2007.10)

(58) Field of Classification Search
CPC .... B60K 2006/4816; B60K 2006/4833; B60K 2006/4841
See application file for complete search history.

(56) References Cited

U.S. PATENT DOCUMENTS

| | | |
|---|---|---|
| 2013/0025949 A1 | 1/2013 | Momal |
| 2019/0160936 A1 | 5/2019 | Lubben et al. |
| 2019/0256077 A1 | 8/2019 | Stoltz |
| 2019/0344653 A1 | 11/2019 | Boete |
| 2021/0339619 A1* | 11/2021 | Kaltenbach .............. B60K 6/48 |

* cited by examiner

| Clutch | Splitter | Main | 2S | Mode: |
|---|---|---|---|---|
| C | S | M | 0 | Drive with EM inhibited. Reduction drag torque or 48V shut off. |
| !C | S | M | 0 | Idem as above but during gearshift |
| C | !S | M | 0 | Idem as above but during gearshift |
| !C | !S | M | 0 | Idem as above but during gearshift |
| C | S | !M | 0 | Idem as above but during gearshift or towing |
| !C | S | !M | 0 | Idem as above but during gearshift |
| C | !S | !M | 0 | Idem as above but during gearshift or towing |
| !C | !S | !M | 0 | Idem as above but during gearshift |
| C | S | M | 4 | Electric driving mode with high torque + starting. |
| !C | S | M | 4 | Electric driving mode with high torque + starting. |
| C | !S | M | 4 | Electric driving mode with high torque + starting. |
| !C | !S | M | 4 | Electric driving mode with high torque + starting. |
| C | S | !M | 4 | Starting |
| !C | S | !M | 4 | End of start |
| C | !S | !M | 4 | PTO driven electrically with high torque. |
| !C | !S | !M | 4 | PTO driven electrically with high torque. |
| C | S | M | 1 | Drive mode. Normal. |
| !C | S | M | 1 | Gearshift, Ecoroll or stop and go eco-roll (if it can be managed to restart while engine is hot without having to switch in high torque mode) |
| C | !S | M | 1 | Gearshift or eco-roll. |
| !C | !S | M | 1 | Gearshift |
| C | S | !M | 1 | Generating electricl energy at standstill. |
| !C | S | !M | 1 | Gearshift |
| C | !S | !M | 1 | PTO driven electrically with low torque. |
| !C | !S | !M | 1 | PTO driven electrically with low torque. |

Clutch : "C" means Clutched; "!C" means clutch open
Splitter: "S" means Splitter in either High split or Low Split; "!S" means splitter in neutral
Main: "M" means gearbox has at least one gear engaged. "!M" means all gears are in neutral
2S: "1" means 2Speed Gearbox (or GB) is in 1:1 ratio. "4" means 2speedGearbox is in 4:1 ratio with freewheel. "0" means 2SpeedGB in neutral

Fig. 8

POWERTRAIN FOR A MILD HYBRID VEHICLE AND VEHICLE COMPRISING THE SAME

CROSS-REFERENCE TO RELATED APPLICATIONS

This application is a U.S. National Stage application of PCT/EP2019/082620, filed Nov. 26, 2019 and published on Jun. 3, 2021, as WO 2021/104612, all of which is hereby incorporated by reference in its entirety.

TECHNICAL FIELD

The invention relates to a powertrain for a mild hybrid vehicle (sometimes known as "Micro Hybrid vehicles") and to a vehicle comprising such a powertrain. Examples of powertrains for hybrid vehicles are disclosed in US 2019/0256077, US 2012/0115668, US 2019/0160936 and US 2019/0344653. The invention can be applied in medium and heavy-duty vehicles, such as trucks, buses, agricultural vehicles and construction equipment.

BACKGROUND

Most of the vehicles in use worldwide are still powered by internal combustion engines (ICE), either gasoline/petrol or diesel. A Hybrid Electric Vehicle (HEV) has at least two sources of power for propulsion: the internal combustion engine and an electric motor.

There are three main reasons for which HEVs are being manufactured and sold:
- reduction of the CO2 emissions (by reduction of the fuel consumption);
- reduction of the exhaust gas toxic emissions; and
- improvement of the powertrain dynamics (by increasing total power and torque).

The HEV's include Mild Hybrid (or Micro-Hybrid), Full-Hybrid and Plug-in Hybrid vehicles. A Mild-Hybrid Electric Vehicle (MHEV) has four main components:
- an electric machine;
- an inverter (usually integrated with the electric machine);
- a DC to DC converter; and
- a high voltage battery.

The electric machine replaces the starter and generator of a conventional powertrain. It can be positioned, relative to the other powertrain components, according to five main configurations:
- P0: The electric machine is connected with the internal combustion engine through a belt, on the front end accessory drive (FEAD);
- P1: The electric machine is connected directly with the crankshaft of the internal combustion engine;
- P2: The electric machine is side-attached (through a belt) or integrated between the internal combustion engine and the transmission;
- P3: The electric machine is connected through a gear mesh with the transmission;
- P4: The electric machine is connected through a gear mesh on the rear axle of the vehicle; the electric machine is decoupled form the ICE and it's located in the rear axle drive or in the wheels hub.

P0 and P1 architectures do not allow the mechanical disconnection of the electric machine from the engine. On the other side, P2, P3 or P4 configurations enable disconnecting the electric machine from the engine through a clutch.

Today, the trend in the automotive industry is to equip the Mild-Hybrid Electric Vehicles with 48V operated electric machines, as such higher electrical power machines bring new possibilities for the vehicle operation, in particular for autonomous vehicles. However, 48V electric machines are not designed to be used in other types of vehicles, such as the trucks or buses (medium-duty and heavy-duty vehicles), because the required torque for starting the engine of such vehicles exceeds what a 48V electric machine can provide.

An obvious solution would be to look for an electric machine capable of providing a higher torque. However, this implies using a larger (and more expensive) battery, such as a 160V battery. In addition, the standards and requirements to be met for this type of voltage are much more stringent.

SUMMARY

An object of the invention is to provide an improved powertrain for a Mild Hybrid vehicle that can be fitted in any vehicle, in particular in trucks or buses.

According to a first aspect, the invention provides a powertrain for a Mild Hybrid vehicle, said powertrain comprising:
- an engine;
- a driveline including a gearbox having an input shaft connected to the engine, an output shaft to be connected to driving wheels of the vehicle and a countershaft for transmitting a rotation of the input shaft to the output shaft which can be coupled to the input shaft;
- an electric machine;
- a gear reduction mechanism having a free wheel and at least three separate and rotatable junction elements, the rotational speeds of the junction elements being interdependent but not having a fixed ratio relative to one another, said junction elements including:
  - a first junction element that is connected to the electric machine;
  - a second junction element that is connectable to the free wheel;
  - a third junction element that is connected to the countershaft;
- wherein the torque ratio between the third junction element and the first junction element can be selected from at least two different ratios, namely a first ratio and a second ratio.

Preferably, the gear reduction mechanism is configured so as to provide a selected one of the following two different ratios:
- a first ratio between the first junction element and the third junction element, to allow the electric machine to operate in motor mode and the gear reduction mechanism to deliver a high first torque;
- a second ratio between the first junction element and the third junction element, the second ratio being lower than the first ratio, to allow the gear reduction mechanism to deliver a second torque from one component of the powertrain to at least one of the countershaft, the electric machine and possibly an auxiliary, the second torque being lower than the first torque.

By the provision of a vehicle powertrain in which the electric machine is connected to the gearbox countershaft through a gear reduction mechanism having two different speed ratios, it is possible to select the ratio depending on the operating mode of the vehicle. Accordingly, when the electric machine is to be used as a starter, the higher transmission ratio can be selected so that the engine receives enough torque to start. Otherwise, a lower ratio can be selected when the electric machine is to be used as a generator, that is the rest of the time. It is then understood that the electric machine replaces the starter and the alternator that were traditionally used on vehicles.

More specifically, such an arrangement, in particular with a gear reduction mechanism which can provide two different ratios, bring significant advantages:

it allows using the first ratio for starting the engine, even with an electric machine that cannot provide a sufficient torque on itself.

The electric machine then operates in a motor mode and starts the engine through the gear reduction mechanism and the countershaft, owing to the high torque provided;

it prevents over-speed that could damage the electric machine, owing to the use of the second ratio, and to the fact that the free wheel causes an automatic decoupling between the engine and the electric machine before the ratio of the gear reduction mechanism has changed from the first one to the second one.

The first and second ratios are defined as being the value obtained by dividing the rotational speed of the first junction element by the rotational speed of the third junction element, and represents the torque multiplying factor from the first junction element to the third junction element.

The powertrain may further include at least one auxiliary, the third junction element being connectable to the auxiliary. There may be provided one or several auxiliaries such as a water pump, an air conditioner compressor, a cooling fan, a piece of equipment to be powered by the vehicle driveline, etc. The invention allows driving the auxiliaries in various ways: electrically or by the engine; with a high torque and a low speed, or with a lower torque and a higher speed.

Also, the invention makes it possible to drive the vehicle, more specifically the driving wheels, by the electric machine, through the gear reduction mechanism and the countershaft.

Thus, the invention provides a powertrain that can offer more functionalities than the powertrains of the prior art, and that can be used in many operating conditions of the vehicle. Depending on the way the powertrain is operated, each of the junction elements can form an input or an output, with respect to the direction of power transmission through the powertrain.

It has to be noted that, at a given moment, in case the second ratio is provided, the "component of the powertrain" is a driving component at that moment. Depending on the situation, it can be the countershaft (rotated by the engine or by the wheels), or the electric machine. When the second torque is delivered to the countershaft, it can ultimately be delivered to the engine or to the driving wheels.

In practice, the first ratio can be strictly greater than one, for example equal to 4; the second ratio can be equal to 1.

In an embodiment, the gear reduction mechanism comprises an epicyclic gear including a sun gear, an annular gear, at least one planet gear, which is meshing with both the sun gear and the annular gear, and which is supported by a planet carrier. Preferably, each of the sun gear, planet gear(s) and planet carrier is secured to one of the junction elements.

In an embodiment, the first junction element is secured to or formed by the sun gear, the second junction element is secured to or formed by the annular gear, and the third junction element is secured to or formed by the planet carrier.

The gear reduction mechanism may further comprise a control member which is able to move the second junction element between a first position in which it is rotationally secured to the free wheel, so that the gear reduction mechanism can deliver the first torque, and a second position in which it is rotationally secured to the third junction element, so that the gear reduction mechanism can deliver the second torque.

The control member may be secured to the annular gear, such as a slider secured to the annular gear. For example, the control member can be movable according to a translation parallel to a longitudinal direction.

Preferably, the control member is able to move the second junction element in a third position in which it is uncoupled from the free wheel and from the third junction element.

The powertrain further comprises a coupling, in the form of a Power Take-Off (PTO), which is connected to the countershaft, and configured to be coupled to a fitting of an auxiliary. The coupling may further be connected to the third junction element. Owing to the powertrain according to the invention, the coupling can be driven by the electric machine even when the engine is stopped or the driveline decoupled from the gear reduction mechanism; Besides, the coupling can be driven with the first or second ratio, depending on the needs.

With the arrangement of the invention, the third junction element is connected to both the coupling and the countershaft; the gear reduction mechanism is not located between the countershaft and the coupling.

Said coupling is arranged at one end of a shaft which, in the mounted position, is an extension of the countershaft or is configured to have the same rotational speed as the countershaft.

The powertrain further comprises an additional gearing mechanism as a connecting mechanism between the third junction element and the countershaft, and between the third junction element and an auxiliary, if such an auxiliary is provided.

The additional gearing mechanism can be configured to provide a third torque ratio greater than 1, said third torque ratio being defined between the part of the additional gearing mechanism connected to the third junction element and the opposite part of the additional gearing mechanism which is connectable to the countershaft (or to an auxiliary, if such an auxiliary is provided). This third ratio is for example equal to 4.

The additional gearing mechanism is configured to create an offset along a direction orthogonal to a longitudinal direction, in the mounted position, between the countershaft and the first junction element. An advantage of such an implementation is that it offers space for accommodating both the electric machine and an auxiliary connected to the coupling. In other words: the shaft having the coupling (PTO) at one end is offset, orthogonally to the longitudinal direction, with respect to the first junction element, in particular to an axis of the first junction element.

The free wheel may be fixedly mounted on a non-rotating part of the powertrain, such as a gear reduction mechanism housing.

In an embodiment, the gear reduction mechanism is connected to the countershaft on a side opposite the engine, along a longitudinal direction. The gear reduction mechanism and the countershaft are not necessarily arranged along the same direction. By "along the longitudinal direction" is meant "as projected on the longitudinal direction". In practice, the countershaft may have one end connected to the engine, via meshing gear wheels and the input shaft, and one opposite end connected to the gear reduction mechanism.

The electric machine can connected to the countershaft, through the gear reduction mechanism, on a side opposite the engine, along the longitudinal direction. This corresponds to a so-called "P3 position".

In an embodiment, the connection between the electric machine and the first junction element is devoid of any pulley or belt. Then, the powertrain can be more compact and comprises less components which may wear over time.

The electric machine can be a 48V operated electric machine. The powertrain of the invention is of particular interest for such machines. Indeed, it makes it possible to use these advantageous machines without their drawbacks. In particular, a 48V operated electric machine can be used to start the engine thanks to the high first ratio of the gear reduction mechanism without requiring a conventional 24V starter and a conventional 24V generator with associated 24V battery—in addition to 48V battery—and without requiring the development of a 48V starter.

The electric machine can operate as a motor or as a generator.

According to a second aspect, the invention relates to a vehicle comprising a powertrain as previously described, and driving wheels connected to the output shaft of the gear box.

The gearbox can be in one of the following states:
- a drive state, in which the countershaft is drivingly connected to the engine, and to the driving wheels, the input shaft and output shaft being drivingly connected according to a speed ratio which depends on which gear of the gearbox is engaged;
- an unclutched state, in which the countershaft is disconnected from the engine by means of a clutch, but drivingly connected to the driving wheels;
- a neutral state, in which the countershaft is drivingly connected to the engine, but disconnected from the driving wheels;
- an unclutched neutral state, in which the countershaft is disconnected from both the engine and the driving wheels.

With the gear reduction mechanism being in a configuration for providing the first ratio, the method comprises:
- the gearbox being in the neutral state, staring the engine by the electric machine;
- or, the gearbox being in the unclutched neutral state, with the powertrain comprising a coupling, such as a power take-off (PTO), which is connected to the countershaft, and configured to be coupled to a fitting of an auxiliary, driving the coupling by the electric machine, at high torque and low speed;
- or, the gearbox being in the unclutched state, driving the driving wheels by the electric machine, at high torque and low speed.

With the gear reduction mechanism being in a configuration for providing the second ratio, the method comprises:
- the engine being running, and the gearbox being in the drive state, driving the electric machine and the auxiliary by the engine;
- or, the engine being running, and the gearbox being in the drive state, operating the electric machine in motor mode so that it can provide additional torque to the engine and/or to the auxiliary;
- or, the gearbox being in the unclutched state, driving the auxiliary by the driving wheels rotated by the vehicle inertia;
- or the gearbox being in the unclutched state, recovering braking energy by the electric machine;
- or, the gearbox being in the drive state and the engine in engine brake mode, recovering energy by the electric machine and increasing the engine brake torque;
- or, the gearbox being in the unclutched neutral state, driving the auxiliary by the electric machine.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the Drawings:

FIG. 8 is a table that summarizes all possible operating modes of the powertrain according to the invention.

DETAILED DESCRIPTION OF EXAMPLE EMBODIMENTS OF THE INVENTION

Figure 1:
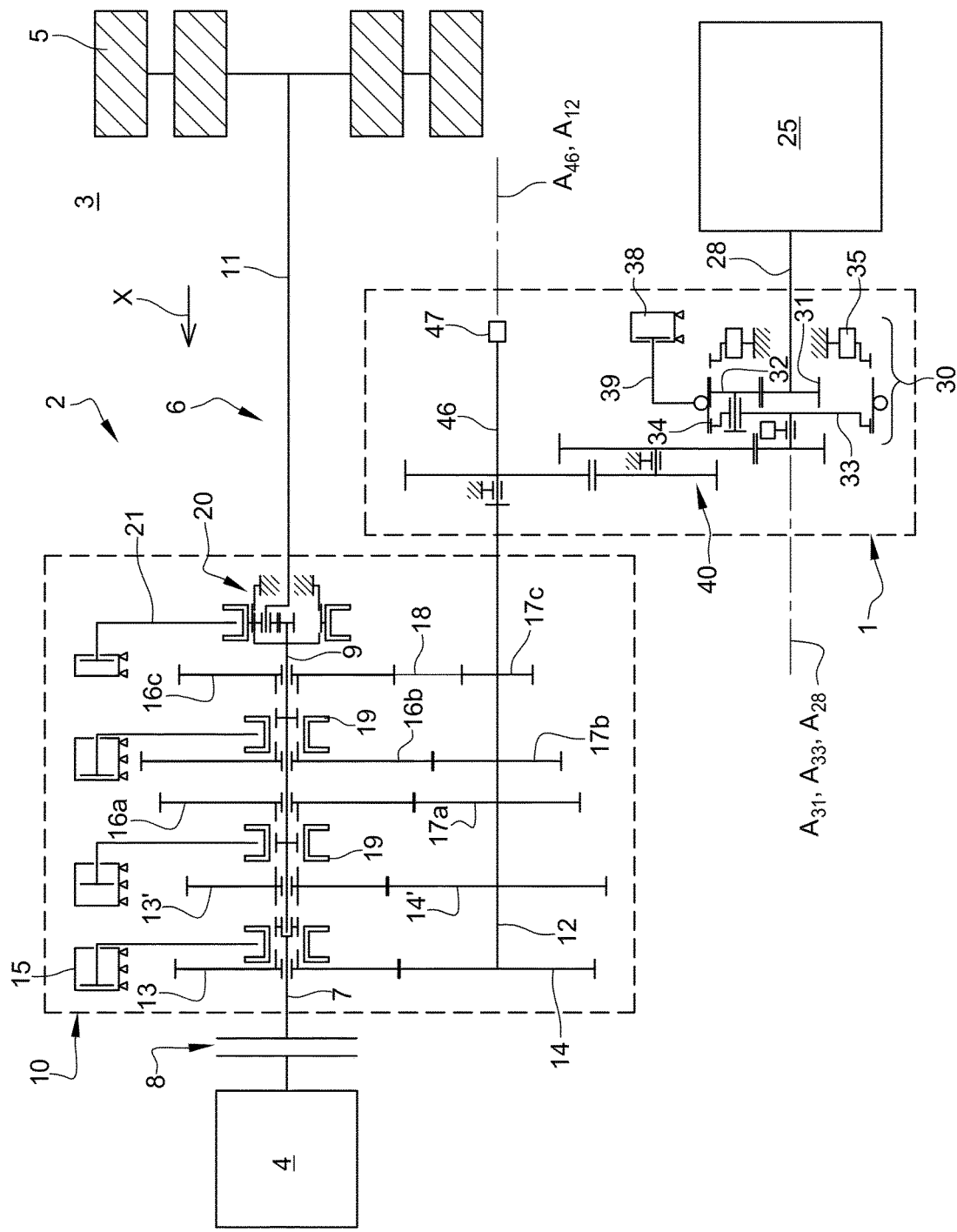
FIG. 1 is a schematic representation of a vehicle comprising an engine, a driveline including a gearbox, driving wheels, an electric machine and a drive system according to an exemplary embodiment of the invention.

FIG. 1 shows an example of a drive system 1 for a powertrain 2 of a vehicle 3. In a non-limiting embodiment, the vehicle 3 may be a truck comprising a cab and a cargo body, the powertrain 2 being for example located inside the cab, below the seats.

The powertrain 2 comprises an engine 4, such as an Internal Combustion Engine (ICE), which enables to drive wheels 5 through a driveline 6. Wheels 5 are known as "driving wheels" or "drive wheels": They transform an applied torque into a traction force exerted by the tires on the road. The driveline 6 extends along a longitudinal axis X which corresponds to the longitudinal axis of the vehicle 3.

The driveline 6 includes a gearbox 10 that can be manual or automatic. The gearbox 10 has an input shaft 7 connected to the engine 4 through a clutch 8 (also known as "main clutch"), and an output shaft 9 connected to the driving wheels 5, through a propeller shaft 11, and generally through a differential (not shown). The input shaft 7 and the output shaft 9 are preferably aligned with one another. The gearbox 10 further has a countershaft 12 that extends parallel to the input shaft 7 and output shaft 9.

The countershaft 12 can be coupled to the input shaft 7 through at least one set of Meshing gear wheels, preferably through a first set of meshing gear wheels 13, 14 or a second set of meshing gear wheels 13', 14'. A clutch 15 (also known as "splitter mechanism" or "splitter") is provided for activating one set among the first set of meshing gear wheels 13, 14 and the second set of meshing gear wheels 13', 14', in order to select the transmission ratio between the input shaft 7 and countershaft 12. Typically, the clutch 15 is a dog clutch.

Basically, the gear wheels 13 and 13' are by default free to rotate around the input shaft 7 and the gear wheels 14 and 14' are fixed in rotation with countershaft 12. The clutch 15 is arranged on the input shaft 7 and is configured to rotationally couple either the gear wheel 13 or 13' with input shaft 7, depending on the selected ratio.

The clutch 15 may also take a neutral position in which none of the gear wheels 13 and 13' are rotationally coupled to input shaft 7. In this case, gear wheels 13 and 13' remain free to rotate around the shaft 7. Accordingly, the countershaft 12 and input shaft 7 are not coupled to one another.

Besides, the countershaft 12 can be coupled to the output shaft 9 through one set of meshing gear wheels among several sets, preferably through three sets of meshing gear wheels 16a, 17a; 16b, 17b; and 16c, 17c, 18, the latter set of gear wheels (16c, 17c, 18) allowing to move reverse. Selection of the appropriate gear ratio can be achieved using engaging devices 19 (also known as "clutches") controlled by an electronic control unit (not shown). More specifically, in the shown embodiment, the gear wheels 16a, 16b, and 16c are free to rotate around output shaft 9, that is why they are often called "freely spinning gears" but may be selectively rotationally coupled to said output shaft 9 (and rotate together with output shaft 9) through the corresponding engaging device 19.

Precisely, a first clutch 19 is configured to selectively rotationally couple gear wheel 16a to shaft 9 and a second clutch 19 is configured to rotationally couple either the gearwheel 16b or 16c to the shaft 9.

In the example, the gearwheels 17a, 17b and 17c are fixed in rotation with the countershaft 12. The gear wheel 18 (that enables to go reverse) is arranged between gear wheels 16c and 17c.

To sum up, the gearbox 10 is 4-speed gearbox (plus a reverse speed).

A range gear 20, for example comprising an epicyclic gear, and a corresponding engaging device 21, can be provided for connecting the gearbox output shaft 9 and the propeller shaft 11. Advantageously, the engaging device 21 can be put in a neutral position, in which the output shaft 9 is disconnected from the countershaft 12.

Owing to the above described arrangement, the gearbox 10 can be in one of the following configurations, provided that the output shaft 9 and propeller shaft 11 are rotationally coupled the one to the other:
- drive configuration: countershaft, the input shaft 7 and output shaft 9 are drivingly connected the one with the other through countershaft 12, according to a speed ratio which depends on which gear is engaged;
- unclutched configuration: input shaft 7 is disconnected from the engine 4 by means of clutch 8 (or countershaft 12 is disconnected from input shaft 7), but countershaft 12 remains drivingly connected to the output shaft 9;
- neutral configuration: the countershaft 12 is drivingly connected to the engine 4, but disconnected from the output shaft 9;
- unclutched neutral configuration: the countershaft 12 is disconnected from both the engine 4 and the output shaft 9.

The powertrain 2 further comprises an electric machine 25. The electric machine 25 is preferably a 48V operated electric machine. 48V technology enables higher electrical power generation, which makes it possible to provide additional features or functions, such as secondary axle steering, braking energy recovering, Start & Stop, new equipment (electronic control unit, sensors, actuators . . . ) specially adapted for autonomous vehicles, etc.

Preferably, the electric machine 25 can operate as a motor (that is transforming electric energy into mechanical energy) or as a generator (that is transforming mechanical energy into electric energy). It is preferably a DC type electric machine, for example a brushless motor.

A 48V battery (not shown) is provided for powering the electric machine 25 in motor mode and for recovering mechanical energy, such as braking energy, when the electric machine operates as a generator.

Figure 2:
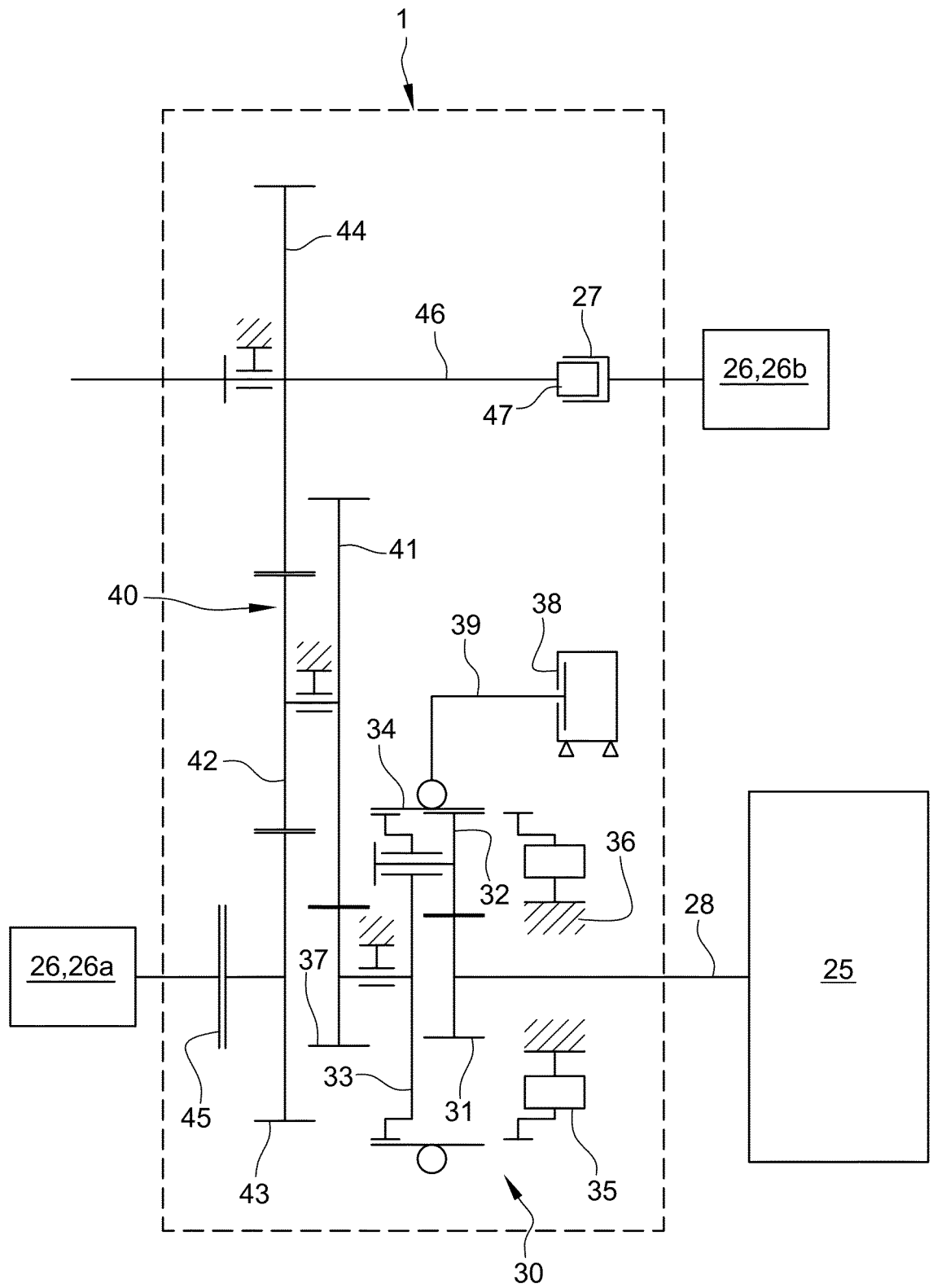
FIG. 2 is an enlarged view of the drive system of FIG. 1, further connected to two auxiliaries.

Optionally, the powertrain 2 also comprises at least one auxiliary 26 (see FIG. 2). The auxiliary may be a device directly linked to the functioning of the engine (such as a fuel pump, an oil pump, a fan), auxiliary device necessary for other main functions of the vehicle (such as a power steering pump, an air compressor for an air brake system or an air suspension system), or auxiliary device not directly linked to the functioning of the engine (in particular an equipment such as a trash compactor, a cargo refrigerating unit, a crane, a ladder, etc.).

Two auxiliaries 26 are shown in the non-limiting embodiment illustrated in FIG. 2, namely an air conditioning compressor 26a and an equipment 26b having a fitting 27. To be operated, the equipment 26b needs to be powered by a power supply of the vehicle 3.

Preferably, the drive system 1 drivingly connects the countershaft 12, the auxiliaries 26 and the electric machine 25. The drive system 1 is used to transmit an appropriate torque, at a given time, from one component of the vehicle 3 that is a driving component at that time, to at least one of the countershaft 12, the auxiliaries 26 and the electric machine 25. By "appropriate torque", it is meant a torque required for operating the component receiving said torque without damaging the powertrain. Depending on the configuration of the gearbox 10 among the above described four configurations, the rotation of the countershaft 12 (as a driving or a driven component) may result from or lead to the rotation of the engine 4 or of the wheels 5.

The drive system 1 is connected to the countershaft 12, preferably on a side opposite the engine 4, along the longitudinal axis X.

The drive system 1 comprises a gear reduction mechanism 30 having three separate and rotatable junction elements, the rotational speeds of the junction elements being interdependent but not having a fixed ratio relative to one another. In an embodiment, the gear reduction mechanism 30 comprises an epicyclic gear (also known as (a.k.a) "planetary gear" or "Epicyclic gearing") including:
- a sun gear 31 (a.k.a "sun wheel"), as a first junction element;
- an annular gear 34 (a.k.a "ring gear" or "ring wheel") as a second junction element;
- at least one planet gear, preferably a plurality of planet gears 32 (a.k.a "planet pinions" or "planetary wheels") meshing with both the sun gear 31 and the annular gear 34, each planet gear having an axis A32;
- a planet carrier 33, as a third junction element, the planet carrier 33 supporting the planet gears 32.

The drive system 1 also comprises a free wheel 35 (a.k.a "overrun clutch") which can be fixedly mounted on a non-rotating part, such as the planetary gear housing 36. The free wheel 35 is preferably located on a side of the drive system 1 opposite the countershaft 12. The free wheel 35 may comprise an outer cylinder fixedly mounted inside the housing 36 and an inner cylinder. The inner cylinder can freely rotate around the main axis of the gear reduction mechanism 30 with respect to the outer cylinder in one direction, which corresponds to a "free" state of the free wheel 35, while the inner cylinder cannot rotate around said main axis with respect to the outer cylinder in the opposite (or other) direction, which corresponds to an "engaged" state of the free wheel 35. Several embodiments can be envisaged for the free wheel 35 (ratchet, with rolling elements, with cams, etc.).

In the example, the inner cylinder of the free wheel 35 is rotationally coupled to the annular gear 34, meaning that the inner cylinder of the free wheel 35 rotates together with the annular gear 34 when the free wheel 35 is its "free" state. Inversely, the inner cylinder of the free wheel 35 blocks the rotation of the annular gear 34 when it is in "engaged" state.

The sun gear 31 is connected to the electric machine 25. To that end, the sun gear 31 can be secured on a main shaft 28 of the electric machine 25 or mounted so that its rotational speed has a fixed ratio relative to the main shaft 28. In the illustrated embodiment, the axis A31 of the sun gear 31 is the same as the axis A28 of the electric machine main shaft 28. In the example, the connection between the electric machine 25 and the sun gear 31 is devoid of any pulley or belt.

The planet carrier 33 has a rotation axis A33 which is the same as the sun gear axis A31, and which is also the main axis of the gear reduction mechanism 30. The planet carrier 33 is connected to the countershaft 12, and is connectable to the auxiliary 26 (In this specific arrangement).

Optionally, the drive system 1 comprises an additional gearing mechanism 40 as a connecting mechanism between the planet carrier 33 and the countershaft 12 and between the planet carrier 33 and the auxiliary 26. In an embodiment, the additional gearing mechanism 40 may be configured to provide a ratio greater than 1, for example equal to 4.

Said ratio is defined as the ratio between the rotational speeds of:
the part of the additional gearing mechanism 40 connected to the planet carrier 33;
and the opposite part of the additional gearing mechanism 40 which is connectable to the countershaft 12 or to the auxiliary 26.

For example, the additional gearing mechanism 40 may comprise a first gear wheel 41 meshing with a gear wheel 37 secured to the planet carrier 33, and a second gear wheel 42 secured to the first gear wheel 41 and having a smaller diameter than that of said first gear wheel 41. The second gear wheel 42 may mesh with a third gear wheel 43 to be connected, possibly through a clutch 45, to the auxiliary 26a, and with a fourth gear wheel 44.

In other words, the ratio of the additional gearing mechanism 40 is the value obtained by dividing the rotational speed of the gear wheel 37 by the rotational speed of the fourth gear wheel 44, and represents the torque multiplying factor from the gear wheel 37 to the fourth gear wheel 44.

The fourth gear wheel 44 may be secured to a shaft 46 which is an extension of the countershaft 12 or which is configured to have the same rotational speed as the countershaft 12. The end of the shaft 46, which is opposite to the countershaft 12, comprises a coupling 47, such as a Power Take-Off (PTO), which is configured to be coupled to the fitting 27 of the auxiliary 26b. The coupling 47 is therefore connected to the planet carrier 33. The rotation axis A46 of the shaft 46 may be coincident with the rotation axis A12 of the countershaft 12.

The electric machine 25 is preferably connected to the countershaft 12, through the drive system 1, on a side opposite to the engine 4, along the longitudinal axis X. In other words, the electric machine 25 is arranged in the so-called "P3 position".

As it can be seen on FIGS. 1 and 2, the additional gearing mechanism 40 is preferably configured to create an offset along a direction orthogonal to the longitudinal axis X between the countershaft 12 and the sun gear 31. In other words, there is an offset between axes A12, A46, on the one hand, and axes A28, A31, A33, on the other hand. This implementation allows providing enough room for both the electric machine 25 and the auxiliary 26b coupled to the coupling 47, as shown in FIG. 2.

In the example, an actuator 38 is used to move the annular gear 34 between:
a first position (FIG. 3), in which the annular gear 34 is secured to the free wheel 35;
a second position (FIG. 4) in which the annular gear 34 is no more secured to the free wheel 35, but to the planet carrier 33, blocking then the rotation of the planet gears 32 relative to the planet carrier 33 (spinning motion); and
a third position (not shown), in which the annular gear 34 is neither secured to the free wheel 35, nor to the planet carrier 33.

As a result, the gear reduction mechanism 30 can provide a selected one of two different ratios, namely a first ratio when the annular gear 34 is in the first position, and a second ratio when the annular gear 34 is in the second position, as it will be explained below.

The first and second ratios are defined as being the value obtained by dividing the rotational speed of the sun gear 31 by the rotational speed of the planet carrier 33, and represents the torque multiplying factor from the sun gear 31 to the planet carrier 33.

In practice, the annular gear 34 can be movable according to a translation parallel to the longitudinal axis X, typically along axis A31. A coupling member (not shown), such as a clutch dog, that is to say a clutch with engaging teeth, can be provided between parts to be coupled.

In the example, the actuator 38 is a cylinder, preferably a hydraulic cylinder or a pneumatic cylinder. It includes a cylinder rod 39 that is secured to the annular gear 34. The actuator 38 may be controlled by an electrical control unit (not shown) depending on data provided by appropriate sensors of the vehicle 3, said data being representative of at least one vehicle parameter or condition, such as the operating phase of the vehicle (for example if the vehicle is in a starting phase or a coasting phase), the current state of the powertrain (gearbox clutched or not, engine in braking mode, etc.), the auxiliary needs, etc. Indeed, the actual vehicle parameter or condition can require the drive system 1 to operate with the first ratio or, on the contrary, with the second ratio.

Preferably, in each of said positions, the annular gear 34 remains meshed with the planet gears 32. In an alternative embodiment, there may be provided a default position among the first and second positions, with a biasing means (such as a spring) urging the annular gear 34 to this default position.

Figure 3:
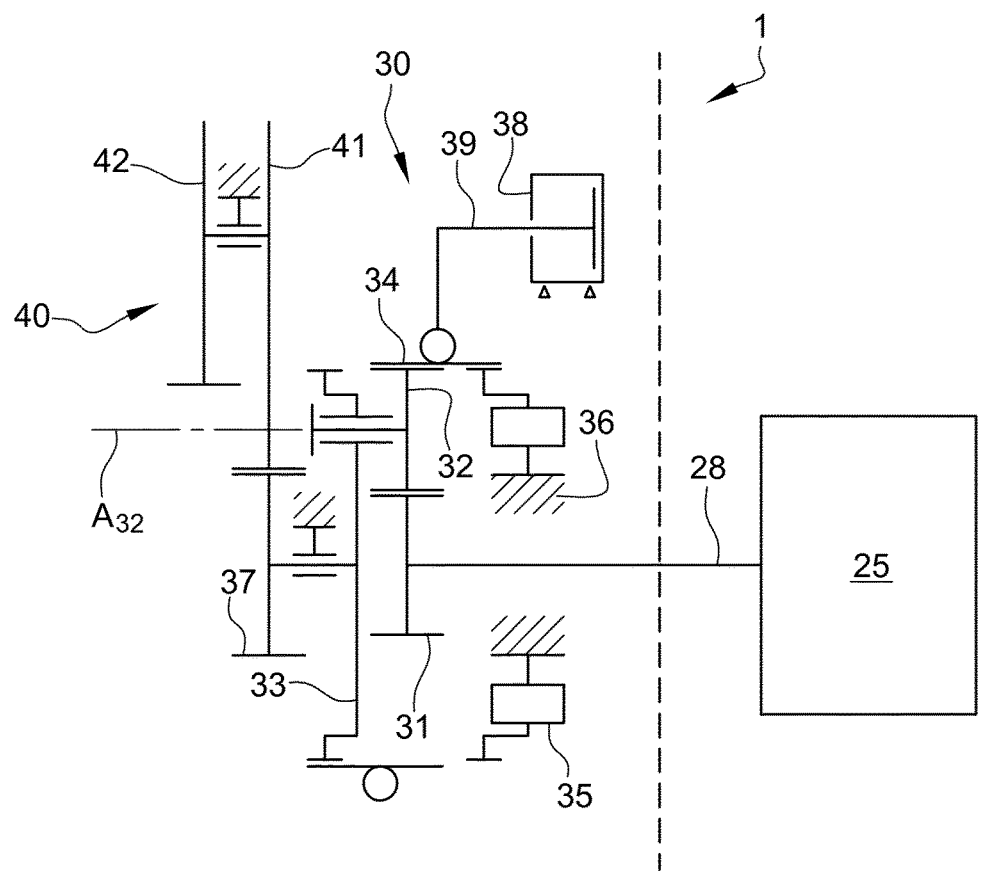
FIG. 3 partially shows the drive system in a first configuration.

Reference is made to FIG. 3, which shows the annular gear 34 in the first position, i.e. the annular gear 34 and the inner part of the free wheel 35 being rotationally secured to one another.

Then, the gear reduction mechanism 30 provides a first ratio between the sun gear 31 and the planet carrier 33, to allow the electric machine 25 to operate in motor mode and the drive system 1 to deliver a high first torque.

Figure 5:
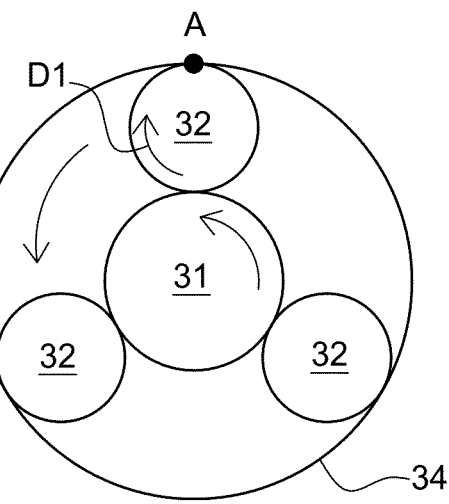
FIG. 5 to 7 schematically show three different operations of the gear reduction mechanism of the drive system.

The electric machine 25 drives the main shaft 28, which rotates the sun gear 31. As shown in FIG. 5, as the sun gear 31 rotates, it drives the planet gears 32, which then spins in a direction D1 opposite to the spinning motion of the sun gear 31. By turning in this direction D1, each planet gear 32 exerts a torque on the annular gear 34, which does not cause the rotation of the annular gear 34 because direction D1 is the locking direction of the freewheel (part 36 exerts a resisting torque acting against the torque exerted by planetary gears 32). The annular gear 34 is therefore held stationary and the planet gears 32 roll without slipping on the inner track of the annular gear 34. As a consequence, the planet gears 32 rotate around the axis A28, therefore transmitting a rotational movement to the planet carrier 33.

With this first configuration, the gear reduction mechanism 30 provides a first ratio, which is strictly greater than 1:1, for example equal to 4:1.

For example, if the electric machine 25 provides a torque of 80 N.m, the gear reduction mechanism 30 can increase the torque to 320 N.m. The additional gearing mechanism 40 further multiplies this torque, for example by a ratio equal to 4 as previously described, thus increasing the torque to 1200 N.m.

One use of this first configuration is for starting the engine 4 by means of the electric machine 25, which then acts as a starter.

This is of particular interest for a 48V operated electric machine 25, because such machines generally do not provide enough torque to start the internal combustion engine of a heavy-duty vehicle.

When the driver wants to start the vehicle 3, he/she generally turns a key or switches on an ignition switch. As a result, a battery (not shown) powers the electric machine 25 to start it.

The annular gear 34 may be initially in the first position, as the default position. Alternatively, the annular gear 34 may be placed in said first position following the detection of the information "start the vehicle" by a sensor, and the transmission of this information to the electrical control unit which controls the actuator 38.

The gearbox 10 is placed in the neutral state, meaning that the countershaft 12 is drivingly connected to the engine 4, but disconnected from the wheels 5. The auxiliaries 26, if any, are initially off. However, during the starting phase, at least one auxiliary 26 may be driven by the electric machine 25.

Figure 6:
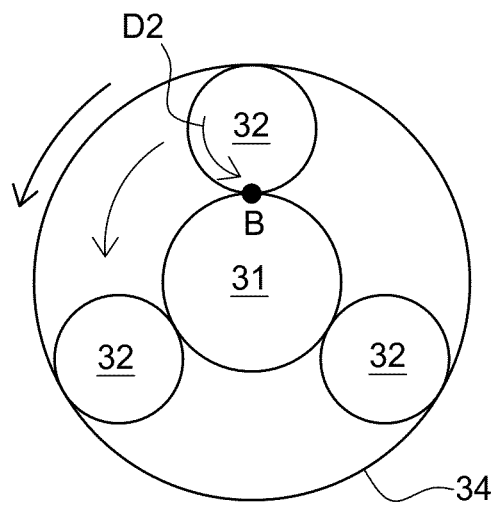

When combustion is established, engine 4 provides torque, and therefore input shaft 7 and countershaft 12 accelerate sharply. Then, the speed of the planet carrier 33 is no more imposed by that of the sun gear 31, but by that of the engine 4. In other words, the planet carrier 33 is no more driven by the sun gear 31: It is driven by the engine 4 through the countershaft 12. In this configuration, the planetary carrier 33 rotates so fast that the planetary gears 32 roll without slipping around the sun gear 31. Accordingly, the spinning motion of the planet gears 32 (that is the rotation of each planet gear 32 about its axis A32) changes of direction, to direction D2, as shown in FIG. 6. As the direction of the torque transmitted from the planet gears 32 to the annular gear 34 changes, this automatically leads the free wheel 35 to transit to its free state. Accordingly, the planet gears 32 start driving the annular gear 34 in rotation about axis A28. Besides, planetary gears 32 and annular gear 34 rotate in the same direction. When the free wheel 35 is in its free state, the engine torque is transmitted to the free wheel 35 and no torque or only an insignificant torque is transmitted from the engine 4 to the electric machine 25, which prevents severe stress in the powertrain components, especially in the electric machine 25.

When it is detected that the engine 4 has been started, the electrical control unit can advantageously control the actuator 38 so as to move the annular gear 34 in the third position. This enables to disconnect the annular gear 34 from the free wheel 35. This, in turn, increases the durability of the gear reduction mechanism 30 because the annular gear ring 34 no more slip against the free wheel inner race. This also enables to avoid subjecting the machine 25 to a high back electromotive force that could damage the machine 25.

While the annular gear 34 is the third position, the electric machine 25 is controlled so that the speed of the sun gear 31 is synchronized with that of the planet carrier 33.

Figure 4:
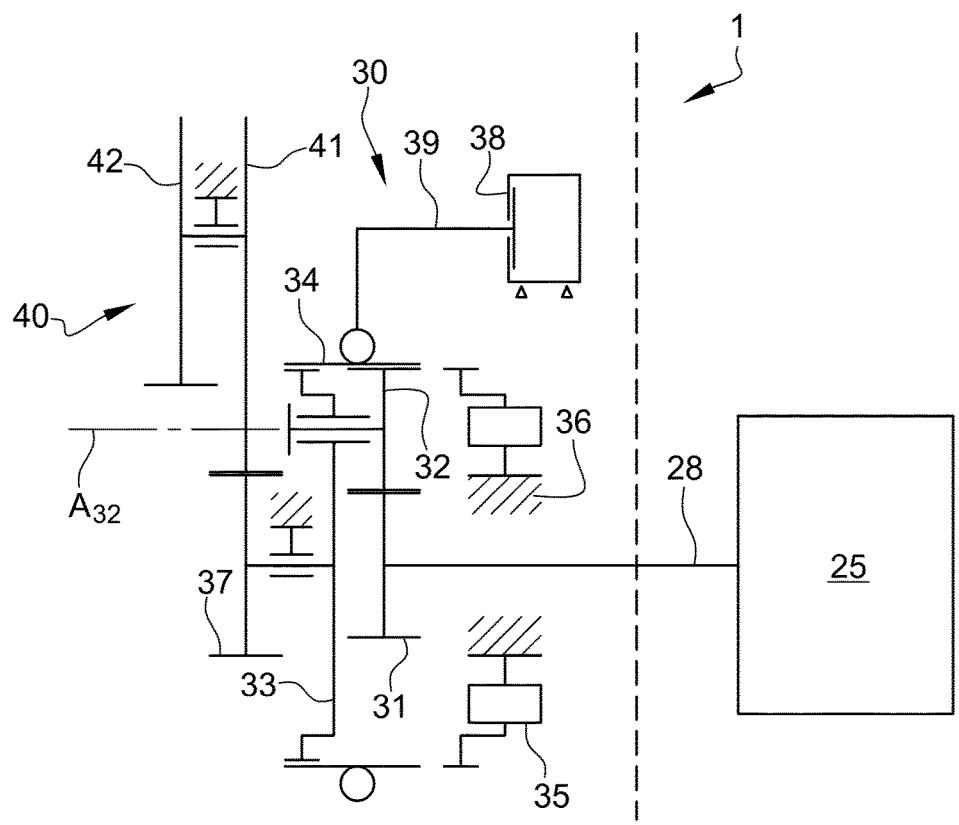
FIG. 4 partially shows the drive system in a second configuration.

After the speed of the sun gear 31 has been synchronized with that of the planet carrier 33, the machine 25 can be switched into the generator mode: To do that, the annular gear 34 is moved into its second position, in which the planet gear(s) 32 and the planet carrier 33 are rotationally secured to one another, as illustrated in FIG. 4.

Then, the gear reduction mechanism 30 provides a second ratio between the sun gear 31 and the planet carrier 33, the second ratio being lower than the first ratio, to allow the drive system 1 to deliver a second torque from one component of the powertrain 2 to at least one of the countershaft 12, the electric machine 25 and the auxiliary 26, the second torque being lower than the first torque.

This second configuration is used, among other applications, in a running phase of the powertrain 2 (i.e. normal driving conditions), following the above described starting phase and the transition of the free wheel 35 from its engaged state to its free state.

The engine 4 is running, causing the rotation of the input shaft 7, of the countershaft 12 and, through the additional gearing mechanism 40, the rotation of the planet carrier 33 about axis A33.

Figure 7:
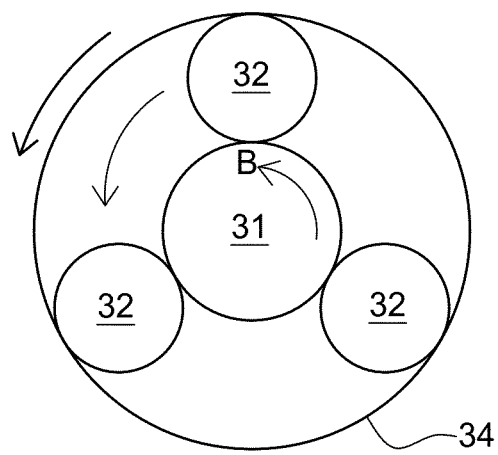
Figure 9:
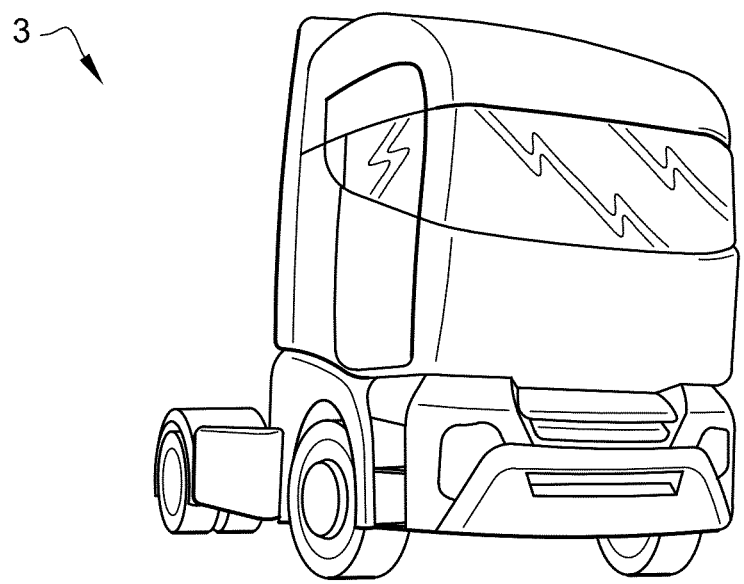
FIG. 9 is a vehicle, in particular a truck, which can be equipped with a powertrain according to the invention.

With the annular gear 34 in the second position, there is no relative motion between the planet carrier 33 and the planet gears 32. Therefore, as shown in FIG. 7, the planet gears 32 cannot rotate about their own axes A32. As a result, the sun gear 31 is rotated about axis A31 at the same rotational speed as the planet carrier 33. In other words, when the annular gear 34 is in the second position, the assembly comprising the planet carrier 33, the planet gears 32 and the sun gear 31 rotate as a whole about axis A31.

Thus, with this second configuration, the gear reduction mechanism 30 provides a second speed ratio, which is equal to 1:1.

In the above described running phase, rotation is transmitted with this second ratio (multiplied by the ratio of the additional gearing mechanism 40) from the engine 4 towards the electric machine 25. The electric machine 25 thus operates in alternator mode, and can recharge a battery. In addition to driving the electric machine 25, the engine 4 can also drive the auxiliaries 26, including the auxiliary 26b driven through the coupling 47.

However, this second configuration, in which the annular gear 34 is in the second position and the gear reduction mechanism 30 provides a second ratio which is equal to 1:1, can be used for other purposes/in other operating conditions to transmit rotation and therefore torque from/to other components of the powertrain 2 as will be described below.

From the running phase, the combustion engine 4 can be temporarily useless, for example if the vehicle is stopped in a traffic jam or at a traffic light. Then, in order to save fuel, the engine 4 can be automatically stopped, before it is restarted in response to a signal. A sensor 37 may be configured to detect that the engine 4 has been stopped.

The powertrain 2 is then in an electric phase (or "electrically driven phase"), in which the auxiliaries 26, and/or another component of the vehicle 3, are driven by the electric machine 25. Depending on the needs:

the gearbox 10 can be in one of the previously listed four states or others;

the gear reduction mechanism 30 can provide either the first or the second speed ratio.

From the electric phase, in order to restart the engine 4, the electrical control unit controls the actuator 38 so that it places the annular gear 34 back in the first position. The gear reduction mechanism 30 can thus provide the first ratio, which will enable the electric machine 25 to restart the engine 4. This movement of the annular gear 34 can be done passively in case a spring or other biasing member is provided to define a default position as previously explained.

The drive system 1 and powertrain 2 according to the invention offer other functionalities that will now be described.

Below is considered the first configuration, i.e. when the electric machine 25 can operate in motor mode and the drive system 1 can deliver a high first torque, for example with a ratio equal to 4.

In this first configuration, preferably when the gearbox 10 is in the unclutched neutral state, the electric machine 25 can rotate the attached equipment 26b, with a high torque, and a low speed. Such an implementation could be useful to complete a hydraulic actuation at high pressure for instance.

Alternatively, when the gearbox 10 in its unclutched state, the electric machine 25 can provide high torque at low speed to the countershaft 12, and thus to the output shaft 9, the propeller shaft 11, and finally to the driving wheels 5. Therefore, the electric machine 25 can electrically move the vehicle 3, generally for a short distance such as several hundred meters. This can be useful to move the vehicle 3 inside a building with zero emission and low noise, to move the vehicle 3 to connect a trailer, etc. One significant advantage of the invention is to allow this even with a low power electric machine.

Below is now considered the second configuration, i.e. when the drive system can deliver a lower second torque from one component of the powertrain to at least one of the countershaft, the electric machine and the auxiliary, wherein the second torque can be equal to 1.

With the gearbox 10 in its drive state, the electric machine 25 can operate in motor mode to boost the vehicle 3, which allows reusing the harvested energy. In particular, while engine 4 is running, and in order to reduce fuel consumption, the electric machine 25 can provide an additional torque to the engine crankshaft and to auxiliaries 26 by consuming the energy stored in the battery.

When the gearbox 10 in its unclutched state, the vehicle 3 can be in sailing mode, i.e. with the engine 4 disconnected from the driving wheels 5, the engine 4 being stopped or idle, in a so-called EcoRoll® mode. Then, the vehicle 3 inertia makes it possible for the driving wheels 5 to rotate the countershaft 12, therefore the shaft 46 of the additional gearing mechanism 40, and ultimately to drive the auxiliaries 26, such as the conditioning compressor 26a and the equipment 26b connected to the coupling 47.

Besides, the electric machine 25 can be used to perform regenerative braking. When the driver depresses the brake pedal, the electric machine 25 is switched in generator mode, which means that part of the kinetic energy of the vehicle can be absorbed in the electric machine. The vehicle then slows down. The mechanical energy (that is the kinetic energy) is transformed in electrical energy and for example stored into the 48V battery.

In an alternative embodiment, the electric machine 25 can act as an electric retarder as well (i.e. use electromagnetic induction to provide a retardation force). Accordingly, when the driver depresses the brake pedal, the electrical windings in the EM (Electric Machine) stator receive power from the vehicle battery, producing a magnetic field through which the EM rotor moves. This induces eddy currents in the EM rotor, which produces an opposing magnetic field to the EM stator. The opposing magnetic fields slows the EM rotor, and hence the countershaft 12, and ultimately the propeller shaft.

When the gearbox 10 in its drive state and the engine 4 in brake mode, the electric machine can recover energy (regenerative braking) and increase the total brake torque.

When the gearbox 10 in its unclutched neutral state, the electric machine 25 can rotate the auxiliaries 26. This can be used:

for electrically driving an air conditioning compressor 26a, without the need for a new air conditioning module. Thus, the invention allows providing cooling by powering the air conditioning compressor 26a either by the engine 4, by the electric machine 25, or by the wheels 5 alternatively, or in addition, so that the electric machine 25 can drive the coupling 47, with a limited torque. This could be useful to have fast movement with low pressure and switch to the first configuration, i.e. with a high first torque, when pressure requirement increases. Thus, the invention allows driving the coupling 47, in particular a PTO, in a full electric mode, according to two different ratios, i.e. according to two different torques/speeds.

Transition from the first ratio to the second ratio, resulting from the movement of the annular gear 34 from the first position (FIG. 3) to the second position (FIG. 4), can be achieved once the free wheel 35 has transited to its free state, i.e. has decoupled the electric machine 25 from reduction gear 30. Said transition can further require preliminary speed synchronization between the electric machine 25 and the planet carrier 33 prior to change the position of the annular gear 34, to ease meshing.

Transition from the second ratio to the first ratio may require preliminary stopping both the planet carrier 33 and the electric machine 25; having their speeds equal to zero ensures that the planet carrier 33 and the electric machine 25 are synchronized.

It has to be noted that, when the gearbox 10 in its unclutched neutral state, the speed of the countershaft 12 is controlled by the electric machine 25. Thus, it can be stopped in all conditions (and eventually bring some energy recovery). This means that engine 4 cannot provide torque to the driving wheels 5 during this transition. Moreover, this should occur only when engine 4 is stopped (to prepare next restart), or for other functionalities offered by the invention that are previously described, and that are engaged only when the vehicle 3 is at standstill.

FIG. 8 represents a table summarizing all possible driving modes that can be performed through the powertrain.

It is to be understood that the present invention is not limited to the embodiments described above and illustrated in the drawings; rather, the skilled person will recognize that many changes and modifications may be made within the scope of the appended claims.

For example, the additional gearing mechanism 40 arranged between the gear reduction mechanism 30 and the countershaft 12 could be downsized, or even removed, to improve compactness and packaging.

The invention claimed is:

1. A powertrain for a Mild Hybrid vehicle, said powertrain comprising:
an engine;
a driveline including a gearbox having an input shaft connected to the engine, an output shaft to be connected to driving wheels of the vehicle and a countershaft couplable to the input shaft for transmitting a rotation of the input shaft to the output shaft;
an electric machine;
a coupling, in the form of a power take-off, which is connected to the countershaft, and configured to be coupled to a fitting of an auxiliary; and
a gear reduction mechanism having a free wheel and at least three separate and rotatable junction elements,
wherein the rotational speeds of the junction elements are interdependent but do not have a fixed ratio relative to one another, said junction elements including: a first junction element that is connected to the electric machine, a second junction element that is connectable to the free wheel and a third junction element that is connected to the countershaft;
wherein the torque ratio between the third junction element and the first junction element can be selected from at least two different ratios, namely a first ratio and a second ratio;
wherein said coupling is arranged at one end of a shaft which, in the mounted position, is an extension of the countershaft or is configured to have the same rotational speed as the countershaft, the powertrain further comprises an additional gearing mechanism as a connecting mechanism between the third junction element and the countershaft, and the additional gearing mechanism is arranged to create an offset between the countershaft and the first junction element, the offset being along a direction orthogonal to an axis of the first junction element,
wherein said offset provides enough room to accommodate, on a side opposite the engine along a longitudinal direction, both the electric machine and the auxiliary coupled to the power take-off.

2. The powertrain according to claim 1, wherein the first ratio is strictly greater than one and/or in that the second ratio is equal to 1.

3. The powertrain according to claim 1, wherein the gear reduction mechanism comprises an epicyclic gear including a sun gear, an annular gear and at least one planet gear which is meshing with both the sun gear and the annular gear, and which is supported by a planet carrier.

4. The powertrain according to claim 3, wherein the first junction element is secured to or formed by the sun gear, the second junction element is secured to or formed by the annular gear, and the third junction element is secured to or formed by the planet carrier.

5. The powertrain according to claim 1, wherein the gear reduction mechanism further comprises a control member able to move the second junction element between a first position in which it is rotationally secured to the free wheel and a second position in which it is rotationally secured to the third junction element.

6. The powertrain according to claim 5, wherein the control member is able to move the second junction element in a third position in which it is uncoupled from the free wheel and from the third junction element.

7. The powertrain according to claim 1, wherein the additional gearing mechanism is configured to provide a third torque ratio greater than 1, said third torque ratio being defined between the part of the additional gearing mechanism connected to the third junction element and the opposite part of the additional gearing mechanism which is connectable to the countershaft.

8. The powertrain according to claim 1, wherein the free wheel is fixedly mounted on a non-rotating part of the powertrain.

9. The powertrain according to claim 1, wherein the gear reduction mechanism is connected to the countershaft on a side opposite the engine, along the longitudinal direction.

10. The powertrain according to claim 1, wherein the electric machine is connected to the countershaft, through the gear reduction mechanism, on the side opposite the engine, along the longitudinal direction.

11. The powertrain according to claim 1, wherein the connection between the electric machine and the first junction element is devoid of any pulley or belt.

12. The powertrain according to claim 1, wherein the electric machine is a 48V operated electric machine.

13. The powertrain according to claim 1, wherein the electric machine is operable as a motor or as a generator.

14. A vehicle comprising a powertrain according to claim 1, and driving wheels connected to the output shaft of the gearbox.

15. The vehicle according to claim 14, wherein the gearbox is in one of the following states: a drive state, in which the countershaft is drivingly connected to the engine, and to the driving wheels, the input shaft and output shaft being drivingly connected according to a speed ratio which depends on which gear of the gearbox is engaged; an unclutched state, in which the countershaft is disconnected from the engine by means of a clutch, but drivingly connected to the driving wheels; a neutral state, in which the countershaft is drivingly connected to the engine, but disconnected from the driving wheels; an unclutched neutral state, in which the countershaft is disconnected from both the engine and the driving wheels.

* * * * *